(No Model.)

A. S. VOSE.
ROTARY CUTTER.

No. 545,618. Patented Sept. 3, 1895.

WITNESSES.
Matthew M. Blunt,
J. Murphy

INVENTOR.
Ambrose S. Vose
By Jas. H. Churchill
ATT'Y.

UNITED STATES PATENT OFFICE.

AMBROSE S. VOSE, OF BOSTON, MASSACHUSETTS.

ROTARY CUTTER.

SPECIFICATION forming part of Letters Patent No. 545,618, dated September 3, 1895.

Application filed June 13, 1895. Serial No. 552,629. (No model.)

*To all whom it may concern:*

Be it known that I, AMBROSE S. VOSE, a citizen of the United States, residing at Boston, county of Suffolk, and State of Massachusetts, have invented an Improvement in Rotary Cutters, of which the following description, in connection with the accompanying drawings, is a specification, like letters and figures on the drawings representing like parts.

This invention relates to that class of apparatus known as "rotary" cutters or trimmers especially adapted for trimming the heels and the edges of the soles of boots and shoes, and is herein shown as embodied in a rotary edge-trimmer.

This invention has for its object to provide a simple, efficient, and cheap rotary cutter or trimmer of a novel construction, as will be described, and one in which the cutting-edges of the trimmer may be simultaneously adjusted.

In accordance with this invention, the rotary cutter or trimmer is provided with segmental sections separated from each other by spaces or slots and having one end of each segmental section provided with a cutter or cutting-edge secured to or forming part of the said section, whereby the segmental section constitutes the knife proper of the rotary cutter or trimmer. The segmental sections referred to are connected to a suitable wheel or head and are capable of being adjusted so as to move the cutting-edges of the segmental sections simultaneously toward and away from the periphery of the said head. The segmental sections referred to are preferably pivoted to the wheel or head, as will be described, and are movable about the said pivots, as herein shown, by means of studs or pins on the segmental sections entering cam-shaped or inclined slots in an actuating-ring carried by the cutter-head, as will be described.

These and other features of this invention will be pointed out in the claims at the end of this specification.

Figure 1:
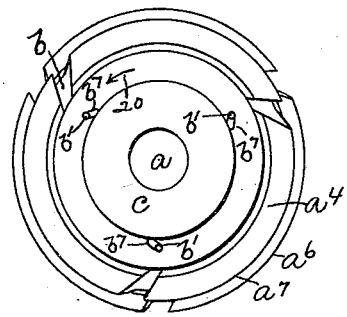
Figure 2:
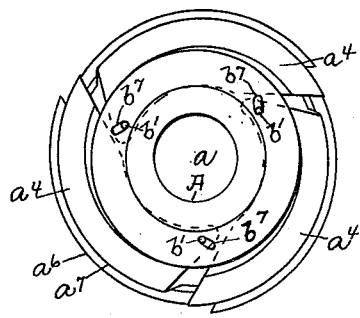
Figure 3:
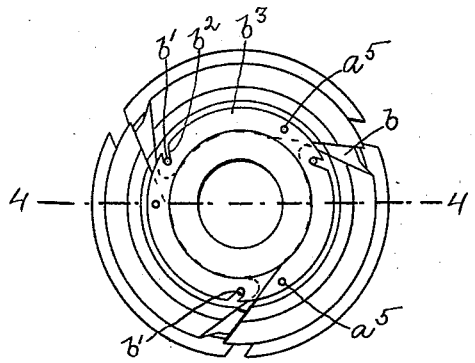
Figure 4:
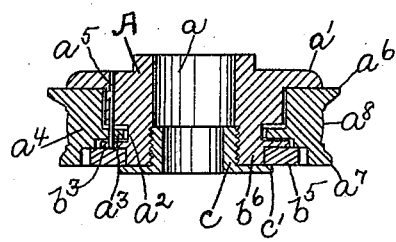
Figure 5:
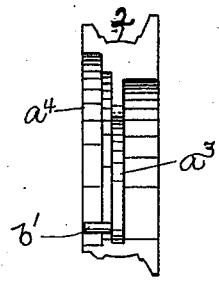
Figure 7:
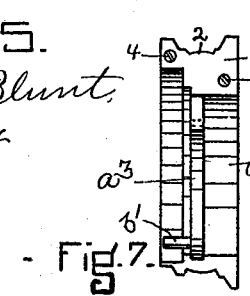
Figure 6:
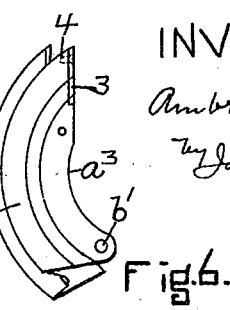

Figure 1 is a side elevation of a rotary edge-trimmer embodying this invention; Fig. 2, a side elevation of the rotary edge-trimmer shown in Fig. 1, with the nut which retains the cam-ring removed; Fig. 3, a side elevation of the rotary trimmer shown in Fig. 1, with the retaining-nut and cam-ring removed; Fig. 4, a section on the line 4 4, Fig. 3, showing the cam-ring and the retaining-nut in operative position; Fig. 5, a detail of one of the segmental sections to be referred to, and Figs. 6 and 7 modifications to be referred to.

Referring to Fig. 4, A represents an annular ring-shaped body or wheel provided with a central bore $a$ for the reception of the shaft upon which the rotary cutter or trimmer is mounted, the ring-shaped body A constituting the cutter-head of the instrument herein shown. The body A, as herein shown, is provided on one side with a flange $a'$ and with an annular groove $a^2$ for the reception of suitable arms or projections $a^3$ secured to or forming part of the segmental sections $a^4$, herein shown as three in number, the said sections being shown in the present instance as pivotally secured to the body A by the pins or pivots $a^5$. Each segmental section $a^4$ is grooved on its periphery, after the manner of ordinary rotary cutter-heads, to form the side flanges $a^6$ $a^7$ and the intermediate circular periphery $a^8$. Each segmental section $a^4$ co-operates with the remaining segmental sections attached to the body or head A, so that in the normal position the peripheries $a^8$ of the said sections will form part of the same circle, having as its center the center of the head or body A. Each segmental section $a^4$ is formed or made inclined at one end and is provided with a cutting-edge 2, which cutting-edge co-operates with the rear inclined portion of the adjacent segmental section $a^4$ to form inclined slots $b$.

The cutting-edge 2 may be an integral part of the segmental section $a^4$, or it may be formed on a separate plate 3, which is secured to the end of the said section in any suitable manner—as, for instance, by screws 4. (See Figs. 6 and 7.) This latter construction may be found preferable, as in case the cutting-edges 4 become dulled the cutters or plates 4 may be readily removed from the segmental sections $a^4$ and replaced by new cutters.

The segmental sections $a^4$, at or near their ends remote from the pivots $a^5$, are herein shown as provided on one side with studs or pins $b'$, which normally extend into slots $b^2$ in the side wall $b^3$ of the annular groove $a^2$, and the said pins have co-operating with them an actuating or cam ring $b^5$, which is fitted about the hub portion $b^6$ of the body A and is provided with inclined or cam-shaped slots $b^7$, into which project pins or studs $b'$ of the segmental cutting-sections.

The cam or actuating ring $b^5$ is fitted over the hub portion $b^6$ of the body A, and is preferably flush therewith, and may be retained locked on the said hub against movement in any suitable or desired manner, preferably by means of a tubular nut $c$, herein shown as screw-threaded on its shank to engage screw-threads on the inner circumference of the body A, and provided with an annular flange $c'$, which laps by the hub $b^6$ and makes contact with the cam-ring $b^5$, as clearly shown in Fig 4.

In the normal position of the segmental cutting-sections the cutting-edges of the said sections are in substantially the same circle as the periphery $a^8$ of the adjacent section, so that the peripheries $a^8$ of all the segmental sections form part of the same circle. The cutting-edges may be moved outward to adjust them by turning the nut $c$ so as to unclamp the cam-ring $b^5$ and then turning the cam-ring $b^5$ in the direction indicated by arrow 20, Fig. 1, so that the studs or pins $b'$ of the segmental cutting-sections are caused to move by their actuating cam-slots $b^7$ toward the center of the cutter, which action turns the segmental cutting-sections on their pivots $a^5$ so as to throw in the rear end and throw out the front or cutting end of each section into the position represented in Fig. 2. The segmental cutting-sections may be moved or adjusted into any desired position, so as to bring the cutting-edge of each section into the desired position to compensate for wear or for other purposes, and when the cutting-edge of each section has been brought into the desired position the clamping-nut $c$ may be then turned up so as to clamp the cam-ring $b^5$ and hold it firm against movement, thereby holding the segmental cutting-sections in their adjusted positions.

I have herein shown the rotary cutter or trimmer as provided with three segmental cutting-sections $a^4$; but I do not desire to limit my invention to this precise number, and, furthermore, I do not desire to limit my invention to the particular means shown for clamping or rendering stationary the movable cam-ring $b^5$.

By an inspection of Fig. 4 it will readily be seen that the parts comprising the rotary cutter or trimmer are easily accessible and replaceable.

I claim—

1. In a rotary cutter or trimmer, the combination of the following instrumentalities, viz:—a body or wheel, a plurality of cutters provided with cutting edges and pivotally secured to the said body or wheel to permit their cutting edges to be adjusted with relation to the periphery of the said body or wheel, pins or projections carried by the said cutters, a rotatable device carried by the said wheel and provided with slots into which the said pins or projections extend, and means carried by the wheel, normally engaging said rotatable device to hold the same against movement, and thereby hold the pivotal cutters with their cutting edges in a fixed position with relation to the periphery of the body or wheel, substantially as described.

2. In a rotary cutter or trimmer, the combination of the following instrumentalities, viz:—a body or wheel provided with a flange and grooved for the attachment thereto of a plurality of cutters pivotally secured to the said body or wheel, pins or projections carried by the said pivotal cutters, an actuating device carried by the said wheel and provided with slots into which the said pins or projections are extended, and a clamping nut secured to the wheel and normally engaging the slotted actuating device, substantially as and for the purpose specified.

3. In a rotary cutter or trimmer, the combination of the following instrumentalities, viz:—a body provided with a bore or opening, a plurality of segmental sections pivotally connected to said body and provided with cutting edges, laterally extended pins or projections carried by said sections, and an actuating ring provided with slots into which the said pins or projections extend, for the purpose specified.

4. In a rotary cutter or trimmer, the combination of the following instrumentalities, viz:—the body A provided with a peripheral groove, segmental sections provided with cutting edges and with arms extended into the said groove, pivot pins securing said arms to the said body, studs or projections extended laterally from the said sections, an actuating ring provided with cam or inclined slots into which the said studs extend, and means to secure the said ring against movement from its adjusted position, substantially as described.

5. In a rotary cutter or trimmer, the combination of the following instrumentalities, viz:—a body provided with a bore or opening, a plurality of segmental cutters pivotally connected to the said body and provided with cutting edges, laterally extended pins or projections carried by the said segmental cutters, and an actuating device provided with slots into which the said pins or projections extend, substantially as described.

In testimony whereof I have signed my name to this specification in the presence of two subscribing witnesses.

AMBROSE S. VOSE.

Witnesses:
JAS. H. CHURCHILL,
J. MURPHY.